United States Patent Office 3,536,563
Patented Oct. 27, 1970

3,536,563
LAMINATED PRODUCTS
Theodorus G. Brandts and Joseph A. Lichtenberger, Grand'Mere, Quebec, and Ole Eiolf Kristiansen, Applehill, Ontario, Canada, assignors to Consolidated Paper (Bahamas) Limited, Nassau, Bahamas
No Drawing. Filed Mar. 13, 1967, Ser. No. 622,472
Int. Cl. B32b 29/00, 31/06, 31/08
U.S. Cl. 156—246      2 Claims

ABSTRACT OF THE DISCLOSURE

A non-woven fabric of high water absorbency, such as towelling, having a pair of liners, for example of crepe paper, and an intermediate layer of a thermoplastic material bonded to the liners, the thermoplastic layer either being unaffected by water or being of a material such as water dispersible polyvinyl acetate which has a high initial wet strength but which is destroyed upon prolonged contact with water and special methods for bonding the layers to produce the lining.

---

This invention relates to laminated non-woven fabrics such as plastics and paper laminates, particularly but not exclusively for use as towelling. More particularly, it relates to a laminate comprising a reinforcing film of thermoplastic material sandwiched between two liners of water absorbent paper.

Disposable paper towels and also wrapping materials are finding increasing utility, but difficulties are encountered in manufacturing on a paper machine, a paper towel which is both strong and soft. A soft sheet may be obtained by loosely bonding soft fibres, but a loosely bonded sheet tends also to be a weak sheet; generally speaking, any worthwhile improvement in softness tends to be accompanied by a loss in strength.

Numerous efforts have been made in the past to overcome this difficulty. Improved softness may be obtained by combining a number of thinner paper plies into a sheet, by adding chemical softening agents, or by perforating and embossing the paper, but these steps merely increase the cost of the paper without adding substantially to its utility.

An additional difficulty is imposed by the requirement that the paper towel must also be strong when wet. This property of wet strength is sometimes obtained by adding to the paper stock synthetic resins such as ureaformaldehyde, and melamineformaldehyde, or chemicals like glyoxal, dialdehyde starch and other starch derivatives. The addition of these chemicals, however, tends to reduce the softness and absorbency of the paper, even when softening and rewetting agents are included.

A further desirable property of a paper towel is good "hand." Hand is determined by a number of physical properties of which flexibility, rigidity, compressibility and surface friction are the most important. The quality of "hand" which is related to 'drape" and limpness is evident in textiles and woven products. Paper machines do not normally produce a product with good hand and drape.

The present invention is directed to providing a laminated paper product in which the favourable properties of paper and plastic are combined to produce a soft and absorbent material, suitable for use as towelling or for other related purposes, and with good hand, drape and limpness.

According to one aspect of the invention, there is provided a non-woven fabric of high water absorbency and high wet strength comprising outer liners in the form of continuous webs of soft, fibrous material of high water absorbency, the fabric having a central continuous reinforcing layer of a thermoplastic material, bonded without intermediate adhesive to said liners, the thermoplastic material having a high initial resistance to disintergration upon contact with water, the laminated fabric having a wet tensile strength of at least twice the combined wet tensile strength of the webs in the unreinforced state.

The central reinforcement preferably may have a basis weight range of 1 to 10 lbs. per ream, and the laminated sheet consisting of the thermoplastic layer and the outer liners may have a basis weight range of 10 to 100 lbs. per ream, depending on the end use of the product.

For small light weight fabrics, e.g. of 20 to 50 lbs. per ream, a preferred basis weight of the thermoplastic material is 1 to 5 lbs. per ream, and with fabrics of heavier grade, for example, between 45 and 100 lbs. per ream the preferred basis weight of the plastic reinforcement is 3 to 10 lbs. per ream.

The paper webs which are used as the outer liners should have a water absorbency which is as high as possible commensurate with having sufficient strength to at least allow its manufacture on a paper making machine. Highly absorbent material of this kind has a low tensile strength even when dry, and in wet form the tensile strength is very much further reduced. It is a requirement of the invention that the laminated fabric has a wet tensile strength of at least twice the combined wet tensile strength of the webs in the unreinforced state.

In accordance with another aspect of the invention, there is provided a method of making non-woven fabric of high water absorbency and high wet strength and comprising outer liners in the form of continuous webs of soft, fibrous material of high limpness and flexibility and high water absorbency, and a central continuous reinforcing layer of a thermoplastic material of high limpness and flexibility and high wet tensile strength, comprising the steps of prefabricating the said liners by pulping, forming and drying the fibres in web form, the resulting web being of just sufficient strength to enable it to pass through a paper making machine without disintegration, passing the central film and the exterior liners together through the nip of a pair of heated press rolls, and controlling the temperature of the rolls in relation to the speed of travel of the laminate to soften the thermoplastic film without scorching the paper so as to heat-bond the liners and the film.

According to yet another aspect of the invention, there is provided a method of making non-woven fabric of high water absorbency and high wet strength and comprising outer liners in the form of continuous webs of soft, fibrous material of high limpness and flexibility and high water absorbency, and a central continuous reinforcing layer of a thermoplastic material of high limpness and flexibility and high wet tensile strength, comprising the steps of prefabricating the said liners by pulping, forming and drying the fibres in web form, the resulting web being of just sufficient strength to enable it to pass through a paper making machine without distintegration, continuously extruding a film of the thermoplastic material and continuously impressing on each side of said film a said liner so as to bond the film and the liners while the extruded film is still in a tacky condition.

The first recited method above has some disadvantages when an oriented plastic film such as polyethylene or polypropylene film is hot laminated to the liners; in such a case, the film can lose some of its orientation and strength.

This disadvantage is overcome in the second above-recited method wherein a freshly extruded film of thermoplastic, for example, polyethylene, is used, so that the thermoplasitc film in the final laminate retains the tensile strength characteristic of freshly extruded thermoplastic film of the same basis weight.

Accordingly, the composite laminate of the invention derives its wet and dry strength from the plastic film, while the paper liners are relatively weak, but soft, limp, and absorbent.

COMPOSITION OF THE PAPER LINERS

The paper liners are preferably made of cellulosic tissue paper and may be made by conventional processes from chemical pulps (kraft or sulfite pulp), groundwood, cotton linters or mixtures. If the final laminate is to be used as small paper hand towels or similar articles, a tissue grade of paper may be employed having a basis weight range of about 10 to 20 lbs. per ream. The laminated towel may be, for example, of about 20 to 50 lbs. per ream. However, it is contemplated that thick and highly absorbent paper may be laminated for end use as bath mats, or large hand towels, or bath towels, in which case the liners may have a basis weight of the order of up to 50 lbs. per ream, the final laminate having a basis weight range of up to about 100 lbs. per ream. The liners may be produced on the Yankee machine or the Fourdrinier machine, and softening agents may be added, although this would not normally be necessary when using the proper paper stock. Since in the finished product the paper liners derive their wet strength from the intimate contact with the water resistant plastic medium, little or no wet strength resin need to be added. The liner sheet may be creped and/or embossed prior or during the laminating procedure.

The paper preferably contains over 50% of a pulp selected from the group consisting of chemical pulp, semichemical pulp, and with less than 50% of mechanical pulp. It is preferably softened by the addition of a quaternary ammonium salt. The liners are prefabricated by pulping, forming and drying the fibres in web form, the resulting web being of just sufficient strength to enable it to be passed through a paper making machine without disintegration. The pulp may be bleached chemical pulp or substantially unbeaten semi-bleached chemical pulp.

Thus, the main emphasis in the choice of paper is softness and absorbency.

The choice of paper is further discussed under the examples given of the preferred methods of manufacture.

COMPOSITION OF THE REINFORCING FILM

The thermoplastic reinforcing film may be made of a variety of materials depending upon the desired qualities of the final product. Thus, if water resistance of the final laminate is desired, films of a material unaffected by water, such as polyolefins, e.g. polyethylene, polystyrene, and polypropylene, may be used. Also, copolymers of polyethylene or polystyrene may be used, such as ethylene-ethyl acrylate co-polymer, ethylene-vinyl acetate co-polymer. For non-water-dispersible towels, the preferred polymer is low molecular weight (low density) polyethylene. Such materials do not swell or disperse in contact with water. The co-polymers mentioned are sometimes more easy to extrude than single polymers in the form of thin films.

WATER DISPERSIBLE PRODUCT

For many purposes, it is necessary to use a water-dispersible film so as to allow the used towel to be, for example, flushed in a toilet. In such a case, films of polyvinyl alcohol, or water-dispersible polyvinyl acetate, may be used, as described in Canadian Pat. No. 778,840, issued Feb. 20, 1968. A suitable water-dispersible polyvinyl acetate film may be made by casting a suitable solution of the polymer onto a travelling conveyor, and after evaporation of the solvent, peeling the resulting film from the conveyor.

The composition preferably comprises a carboxylated polyvinyl acetate resin such as those sold under the trade name "Gelva" of Shawinigan Resins Corporation, for example, "Gelva" C–3 or C–5, with resin viscosities in the range of 10 to 30 centipoises. The preferred solvents are water-miscible solvents such as the lower alcohols, for example, methanol and ethanol.

A curing agent is preferably added to the solution, and is preferably a compound in which the anion of a multivalent metal is associated with a weak acid. Examples of such curing agents which may be added in an amount from 2 to 10% by weight of the polyvinyl acetate are aluminum acetate, aluminum nitrate, aluminum sulphate, ammonium bichromate, chromium acetate, chromium chloride, chromium nitrate, chromium trioxide, ferric oxalate, ferric chloride, and ferric citrate. Chromium acetate is the preferred curing agent.

A plasticizer may be added to the solution and may be of the usual type selected from the group consisting of dibutyl phthalate; a polyglycol such as polyethylene glycol di(2-ethyl-hexoate), methoxypolyethylene glycol, and triethylene glycol di(2-ethylbutyrate); butyl phthalyl butyl glycolate, butyl ricinoleate, and glyceryl triacetate may also be used.

The resulting casting solution has a preferred concentration in the range of 15–50% by weight of total non-volatile material.

The water dispersibility of the film may be increased to any desired degree by adding to the solution sodium hydroxide in an amount of 2 to 10% by weight of the modified polyvinyl acetate. Additions of sodium hydroxide beyond 10% renders the resulting film susceptible to conditions of high humidity, under which conditions the film will soften and become difficult to handle.

METHOD OF MANUFACTURE, TEMPERATURE AND PRESSURE CONDITIONS

The temperature of lamination should be controlled so as to provide good softening and thus good adhesion of the plastic film without causing the paper to scorch. While the temperature is fairly critical, each material has its own optimum lamination temperature, and these vary over a substantial range. In general, too high a temperature may result in the paper liners absorbing excessive amounts of the plastic which in turn may lead to poor water absorption and "hand" of the finished product. Similarly, too low a temperature may result in low strength (particularly wet strength) due to a lack of adhesion between the paper liners and the film. In considering the temperature, the time during which the laminate is exposed to high temperatures is also important, and in general, the greater the speed of continuous lamination, the higher the temperature necessary. Furthermore, the thickness and composition of the paper lining which affords an insulating layer, must be taken into account.

Thus, where the first recited method of passing the sandwich of liners and reinforcement through heated pressure rolls is employed, the rolls, which may be conventional steam heated rolls, embossed if desired, should be heated preferably to a temperature a little above the softening point of the thermoplastic film layer. The appropriate speed of rotation of the rolls can thereafter be readily found.

The pressure applied should be sufficient to assure good adhesion and wet strength. In the case of towelling, too great a pressure should be avoided as this will compact the laminate to a point where poor water absorption and "hand" will result.

In the second above-recited process, where the liners are combined with the central plastic film while the latter is being extruded and is in a hot condition, the temperature employed will be the temperature of extrusion. For example, low density polyethylene would be extruded normally at about 400° F., medium density polyethylene would be extruded at about 600° F.

The method of manufacture is hereafter further illustrated by the following examples, which are not intended to be limitative as to the scope of the invention. In the following examples, a "ream" is defined as 432,000 sq. ins. of surface.

EXAMPLE 1

Two sheets of paper composed essentially of 60% unbeaten semi-bleached kraft (chemical pulp) and 40% groundwood (mechanical pulp), having a basis weight of 15 lbs. per ream, are laminated in the nip of a heated pair of rollers, using a polyvinyl acetate film of 5 lbs. per ream basis weight as the reinforcing and bonding film.

The liners were prefabricated by pulping, forming and drying the fibers in web form.

The polyvinyl acetate film was prepared from a solution containing the following ingredients and prepared at room temperature:

Dry solids (parts by wt.):
Carboxylated polyvinyl acetate (Gelva C-2 V-20)—12 g.
Dibutyl phthalate—1.2 g.
Chromium acetate (added, for example, in the form of a 30% (weight/volume) aqueous solution—0.30 g.
Methanol—25 mil.

The above solution was cast onto a travelling conveyor and dried under heat lamps at a temperature of the order of 150° to 250° F. to a film thickness of 1.0 mils, and thereafter peeled off as a strip.

The temperature of the heated rolls was between 375 and 425° F.

A roll of the above laminate was perforated transversely for tearing into small hand towels.

EXAMPLE 2

Two sheets of tissue paper consisting of 100% bleached kraft (chemical pulp) and having a basis weight of 10 lbs. per ream were laminated in the nip of a pair of steel embossing rolls, using a polyvinyl acetate film as the reinforcing and bonding medium.

The film, which was of improved water dispersibility, was prepared as follows. A solution having the following ingredients was prepared at room temperature:

Dry solids (parts by wt.):
Carboxylated Polyvinyl Actate (Gelva C-3 V-20)—12 g.
Dibutyl phthalate—1.2 g.
Chromium acetate (added, for example, in the form of a 30% (weight/volume) aqueous solution)—0.21 g.
Sodium hydroxide (added, for example, in the form of a 16% (weight/volume) aqueous solution—0.39 g.
Methanol—23 ml.
Water (additional to the above solutions)—2 ml.

The above solution was cast onto a conveyor and dried as in Example 1, and the same temperature was employed for the nip rolls.

By leaving out the chromium acetate catalyst, the water solubility can be increased still further.

The resulting 23 lbs. per ream laminate was found to have a good hand and to be very pliable.

EXAMPLE 3

Two sheets of 12 lbs. per ream basis weight and made up of 50% chemically modified cotton (e.g. HXV—21—Hercules Powder Co.) and 50% bleached kraft (chemical pulp) were laminated into a nip of a pair of heated embossing rolls using a 5 lbs. per ream polyvinyl alcohol film of high molecular weight as the reinforcing and bonding medium.

There was obtained a laminate of high initial wet strength, but the film was capable of complete dissolution in water after two hours.

Similar results may be achieved with the use as a reinforcing and bonding medium of hydrolysed polyvinyl acetate (i.e. a polyvinyl acetate-alcohol co-polymer).

The temperature of the nip rolls was of the order of 250° F., the polyvinyl acetate having an average molecular weight of around 10,000.

EXAMPLE 4

A sheet of low density polyethylene film was extruded horizontally from a melt extruder operating at 400° F. and drawn by a pair of nip rolls to a density of 3 lbs. per ream, the nip rolls being displaced from the extruder slot by a distance such that the sheet was permitted to cool to a temperature where it was still tacky.

Two sheets of heavily creped paper of 15 lbs. per ream basis weight and consisting of 60% bleached kraft (chemical pulp) and 40% fine groundwood (mechanical pulp), softened by the addition of a quaternary ammonium salt (e.g. Arquad, Armour Industrial Chemical Corp.), were fed into the nip rolls on either side of the polyethylene sheet. The nip rolls were water cooled to cause cooling of the polyethylene as it was bonded to the paper liners.

The resulting product was a 33 lbs. per ream, limp, soft, strong and very absorbent towel.

EXAMPLE 5

The process of Example 4 was repeated except that a single unheated roll was used in place of the nip rolls and the polyethylene sheet and liners were drawn downwardly over this roll and over a second guide roll to a winding drum to provide the necessary pressure between the liners and the polyethylene sheet to cause bonding to take place. The second guide roll was water-cooled to assist cooling of the laminate.

The resulting product was found to be similar to that resulting from the process of Example 4.

EXAMPLE 6

Two 15 lbs. per ream basis weight sheets of paper consisting of 90% cotton and 10% bleached kraft papers softened by the addition of a condensation product of ethylene oxide and a fatty acid and a sulfonated mineral oil (e.g. Emersoft sold by Emery Industries) were extrusion laminated by a process similar to Example 4 except that the nip rolls were unheated and uncooled, with 3 lbs. per ream basis weight polypropylene as the reinforcing and the bonding medium. Extrusion temperature was 500° F. The laminate was consolidated by running it through the nip of a cooled pair of matching steel embossing rolls. The resulting product had excellent drape, hand, softness and absorbency.

EXAMPLE 7

The process of Example 6 was repeated, except that the basis weight of each of the paper liners was increased to 45 lbs. per ream, and a reinforcement polyethylene of 7 lbs. per ream basis weight was used. The resulting product was cut into lengths for use as large individual hand towels. The material was highly water absorbent and very soft. However, the tensile strength as measured by saturating a strip of the material with water and submitting it to tension was found to be well over twice the tensile strength of a similar strip of the two outer liners without the reinforcement. The strength of the finished product was sufficient to allow repeated use of the towel for about 5 hand washings and intermediate dryings before the towel had to be discarded.

In the examples above, the strength of the paper during production was just sufficient to enable it to pass successfully through a paper making machine. All emphasis was placed upon the achievement of high water absorbency.

In the examples, the tensile strength as measured on a strip of the product immediately after saturation with water was found to be over twice the tensile strength of a similarly treated strip of the two liners without the thermoplastic reinforcement.

As a further example of a softening agent suitable in Examples 4, 5 and 6 above may be mentioned Cynol (American Cyanamid), a type of polyoxyethylene.

The extruder used in Examples 4, 5 and 6 above was a standard extruder specified for the manufacture of a "sandwich" type product. Such extruders are sold as standard equipment, for example, by Black-Clawson Inc.

Although the laminated paper product of the present invention is particularly suitable for use as towelling, it has many other uses, for example, disposable bath mats, sanitary napkins, toilet tissue, place mats, diapers, windshield wipers, industrial wiper for grease, gasoline, ink, etc., applicator for wax, oil, solvents, etc., leak-proof dressings, leak-proof containers such as bags, bottles, cartons, etc., fabric material such as bed sheets, drapes, etc.

Where the paper is for use with oils and solvents, a polyolefin is preferably used as the reinforcing film. A particularly useful adaptation of the paper is in containers for frozen food, for example, a poultry container where the water absorbent layer absorbs moisture and redistributes it within the waterproof central reinforcement.

We claim:
1. A method of making non-woven fabric of high water absorbency and high wet strength and comprising outer liners in the form of continuous webs of soft, fibrous material of high limpness and flexibility and high water absorbency, and a central continuous reinforcing layer of a thermoplastic material of high limpness and flexibility and high wet tensile strength, comprising the steps of prefabricating the said liners by pulping, forming a web and drying the fibres in web form, passing the central film and the exterior liners together through the nip of a pair of heated press rolls, and controlling the temperature of the rolls in relation to the speed of travel of the laminate to soften the thermoplastic film without scorching the paper so as to heat-bond the liners and the film wherein the thermoplastic film is of polyvinyl acetate in which part of the acetate group has been hydrolysed to alcohol groups to render the film water dispersible upon prolonged exposure to water and wherein the film is prepared by casting onto a travelling endless belt a composition comprising carboxylated polyvinyl acetate, sodium hydroxide, and a water miscible organic solvent, and peeling the resulting film from the conveyor and further wherein said peeled film is inserted between said outer liners.

2. A method of making non-woven fabric of high water absorbency and high wet strength and comprising outer liners in the form of continuous webs of soft, fibrous material of high limpness and flexibility and high water absorbency, and a central continuous reinforcing layer of a thermoplastic material of high limpness and flexibility and high wet tensile strength, comprising the steps of prefabricating the said liners by pulping, forming a web and drying the fibres in web form, the web being of just sufficient strength to enable it to pass through a paper making machine without disintegration, passing the central film and the exterior liners together through the nip of a pair of heated press rolls, and controlling the temperature of the rolls in relation to the speed of travel of the laminate to soften the thermoplastic film without scorching the paper so as to heat-bond the liners and the film wherein the thermoplastic film is of polyvinyl acetate in which part of the acetate group has been hydrolysed to alcohol groups to render the film water dispersible upon prolonged exposure to water and wherein the film is prepared by casting onto a travelling endless belt a composition comprising carboxylated polyvinyl acetate, sodium hydroxide, and a water miscible organic solvent, and peeling the resulting film from the conveyor and further wherein said peeled film is inserted between said outer liners.

References Cited
UNITED STATES PATENTS

| | | | |
|---|---|---|---|
| 2,408,682 | 10/1946 | Porter | 161—250 X |
| 2,546,705 | 3/1951 | Strawinski | 161—250 X |
| 3,256,138 | 6/1966 | Welch et al. | 161—250 X |
| 3,356,556 | 12/1967 | Violette et al. | 161—250 X |

OTHER REFERENCES

Skeist, Irving, "Handbook of Adhesives," Frontispiece, pages 365, 366, 367, 368, Reinhold Pub. Corp., New York City, 1962.

JOHN T. GOOLKASIAN, Primary Examiner

C. B. COSBY, Assistant Examiner

U.S. Cl. X.R.

156—309, 324, 332; 161—250, 251, 270